United States Patent
Tomohisa et al.

(10) Patent No.: US 10,598,829 B2
(45) Date of Patent: Mar. 24, 2020

(54) WATER-RESISTANT ORGANIC THIN-FILM, METHOD FOR PRODUCING WATER-RESISTANT ORGANIC THIN-FILM, AND IMAGE DISPLAY DEVICE INCLUDING WATER-RESISTANT ORGANIC THIN-FILM

(71) Applicant: NITTO DENKO CORPORATION, Ibaraki-shi, Osaka (JP)

(72) Inventors: Hiroshi Tomohisa, Ibaraki (JP); Toru Umemoto, Ibaraki (JP); Shoichi Matsuda, Ibaraki (JP); Tadayuki Kameyama, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 585 days.

(21) Appl. No.: 14/400,633

(22) PCT Filed: Jun. 10, 2013

(86) PCT No.: PCT/JP2013/065981
§ 371 (c)(1),
(2) Date: Nov. 12, 2014

(87) PCT Pub. No.: WO2013/187374
PCT Pub. Date: Dec. 19, 2013

(65) Prior Publication Data
US 2015/0141629 A1      May 21, 2015

(30) Foreign Application Priority Data

Jun. 14, 2012 (JP) ................................ 2012-134972
Jun. 3, 2013 (JP) ................................ 2013-117015

(51) Int. Cl.
*G02B 1/18* (2015.01)
*G02B 5/30* (2006.01)
(Continued)

(52) U.S. Cl.
CPC .............. *G02B 1/18* (2015.01); *C08J 7/065* (2013.01); *C09B 29/0003* (2013.01);
(Continued)

(58) Field of Classification Search
CPC ............................. G02B 1/18; C09B 31/025
(Continued)

(56) References Cited

U.S. PATENT DOCUMENTS 6,262,169 B1 * 7/2001 Helmer ..................... C08F 8/30
524/555
2003/0001135 A1 * 1/2003 Gerlitz ................. C08G 59/184
252/182.13
(Continued)

FOREIGN PATENT DOCUMENTS

EP    2325678 A1 * 5/2011 ............... G02B 5/30
JP    2010-26479 A    2/2010
(Continued)

OTHER PUBLICATIONS

Notification of Transmittal of Translation of the International Preliminary Report on Patentability (Form PCT/IB/338) of International Application No. PCT/JP2013/065981 dated Dec. 24, 2014 with Forms PCT/IB/373 and PCT/ISA/237 (5 pages).
(Continued)

*Primary Examiner* — Jane L Stanley
(74) *Attorney, Agent, or Firm* — Westerman, Hattori, Daniels & Adrian, LLP

(57) ABSTRACT

The present invention relates to a water-resistant organic thin film obtained by crosslinking, with organic nitrogen compounds, an organic thin film comprising an organic dye having an anionic group, wherein
the organic nitrogen compounds are first, second, and third acyclic organic nitrogen compounds each having two or more nitrogen atoms per molecule, wherein
(Continued)

the nitrogen atoms of each of the first, second, and third organic nitrogen compounds are each in a cationic group, and the relation A≤0.4 nm<B<C is satisfied, wherein A represents a distance (nm) between adjacent nitrogen atoms in the first organic nitrogen compound, B represents a distance (nm) between adjacent nitrogen atoms in the second organic nitrogen compound, and C represents a distance (nm) between adjacent nitrogen atoms in the third organic nitrogen compound.

7 Claims, 1 Drawing Sheet

(51) Int. Cl.
*C09D 5/00* (2006.01)
*C09B 29/01* (2006.01)
*C09B 29/095* (2006.01)
*C09B 31/047* (2006.01)
*C08J 7/06* (2006.01)
*C09B 31/02* (2006.01)

(52) U.S. Cl.
CPC ........ *C09B 29/0955* (2013.01); *C09B 31/025* (2013.01); *C09B 31/047* (2013.01); *C09D 5/00* (2013.01); *G02B 5/3033* (2013.01)

(58) Field of Classification Search
USPC .......................................................... 524/612
See application file for complete search history.

(56) References Cited

U.S. PATENT DOCUMENTS

| | | |
|---|---|---|
| 2011/0097483 A1 | 4/2011 | Umemoto et al. |
| 2011/0134526 A1 | 6/2011 | Umemoto et al. |
| 2011/0205629 A1 | 8/2011 | Umemoto et al. |

FOREIGN PATENT DOCUMENTS

| | | |
|---|---|---|
| JP | 2010-156937 A | 7/2010 |
| JP | 2010-266507 A | 11/2010 |
| TW | 201100884 A1 | 1/2011 |

OTHER PUBLICATIONS

International Search Report dated Aug. 20, 2013, issued in corresponding application No. PCT/JP2013/065981.

Taiwan Office Action and Search Report dated Aug. 22, 2014, issued in corresponding Taiwanese patent application No. 102120912.

Office Action dated Feb. 21, 2019, issued in counterpart KR Application No. 10-2014-7030313, with English translation (13 pages).

\* cited by examiner

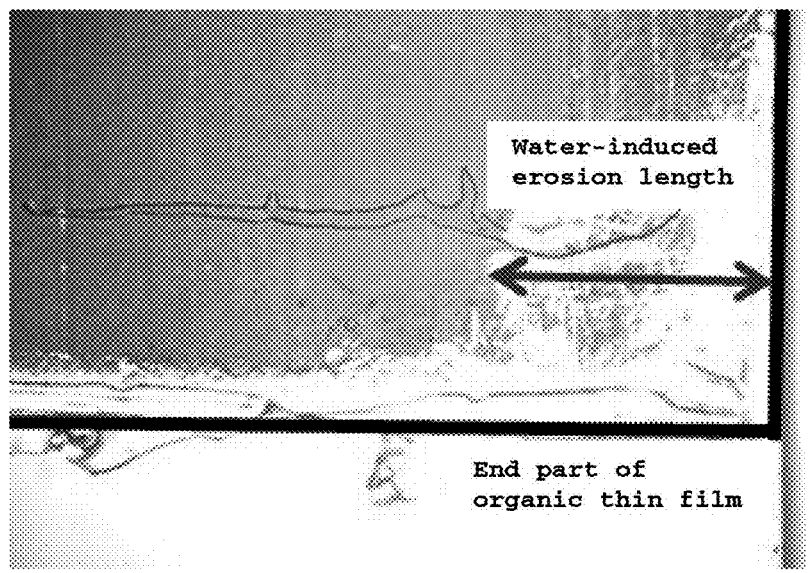

WATER-RESISTANT ORGANIC THIN-FILM, METHOD FOR PRODUCING WATER-RESISTANT ORGANIC THIN-FILM, AND IMAGE DISPLAY DEVICE INCLUDING WATER-RESISTANT ORGANIC THIN-FILM

TECHNICAL FIELD

The invention relates to a water-resistant organic thin film and a method for producing the water-resistant organic thin film. The invention also relates to an image display device including the water-resistant organic thin film.

BACKGROUND ART

Conventional organic thin films such as polarizing films have been required to satisfy both of the following requirements: the films should be free of appearance defects such as cracks; the films should have sufficient durability to humidity. For example, a known water-resistant polarizing film is obtained by applying a solution to the surface of a polarizing film including an organic dye having an anionic group, in which the solution contains two organic nitrogen compounds having two or more nitrogen atoms (see, for example, Patent Document 1).

Another known water-resistant polarizing film is obtained applying a solution to the surface of a polarizing film including an organic dye having an anionic group, in which the solution contains an acyclic compound having two to five nitrogen atoms, and a further known polarizing film is obtained by bringing a cationic polymer-containing liquid into contact with the surface of a polarizing film including an organic dye having an anionic group (see, for example, Patent Documents 2 and 3).

Unfortunately, the polarizing films disclosed in Patent Documents 1 to 3 have problems in that they can be not only cracked, but also eroded at their end part by water in a humidity test so that the molecules at the end part can be out of alignment to become almost optically isotropic. In addition, as water-induced erosion proceeds, the end parts of the films are dissolved and partially chipped in some cases.

PRIOR ART DOCUMENTS

Patent Documents

Patent Document 1: JP-A-2010-266507
Patent Document 2: JP-A-2010-156937
Patent Document 3: JP-A-2010-26479

SUMMARY OF THE INVENTION

Problems to be Solved by the Invention

It is an object of the invention to provide a water-resistant organic thin film that is free from cracking, is free from degradation of optical properties in a humidity test, and does not undergo water-induced erosion at its end part, and a method for producing such a water-resistant organic thin film.

Means for Solving the Problems

The inventors have focused on the fact that the conventional waterproofing treatment methods use only one or two organic nitrogen compounds having two or more nitrogen atoms per molecule. The inventors have found that the object can be achieved using a crosslinking treatment with three or more organic nitrogen compounds having different distances between nitrogen atoms.

The present invention relates to a water-resistant organic thin film obtained by crosslinking, with organic nitrogen compounds, an organic thin film comprising an organic dye having an anionic group, wherein
the organic nitrogen compounds are first, second, and third acyclic organic nitrogen compounds each having two or more nitrogen atoms per molecule, wherein
the nitrogen atoms of each of the first, second, and third organic nitrogen compounds are each in a cationic group, and
the relation $A \leq 0.4$ nm$<B<C$ is satisfied, wherein A represents a distance (nm) between adjacent nitrogen atoms in the first organic nitrogen compound, B represents a distance (nm) between adjacent nitrogen atoms in the second organic nitrogen compound, and C represents a distance (nm) between adjacent nitrogen atoms in the third organic nitrogen compound.

In the water-resistant organic thin film of the invention, the distance A (nm) between nitrogen atoms in the first organic nitrogen compound is preferably from 0.30 nm to 0.40 nm, the distance B (nm) between nitrogen atoms in the second organic nitrogen compound is preferably more than 0.40 nm to 0.70 nm, and the distance C (nm) between nitrogen atoms in the third organic nitrogen compound is preferably more than 0.70 nm to 1.80 nm.

In the water-resistant organic thin film of the invention, the first, second, and third organic nitrogen compounds each preferably have two to five nitrogen atoms per molecule.

In the water-resistant organic thin film of the invention, the cationic group is preferably an amino group or a salt of the amino group.

In the water-resistant organic thin film of the invention, the first, second, and third organic nitrogen compounds are preferably each a compound having an amino group or a salt of the amino group at a molecular end.

In the water-resistant organic thin film of the invention, the first, second, and third organic nitrogen compounds are preferably each independently at least one selected from the group consisting of an aliphatic diamine or a salt of the aliphatic diamine, an aliphatic triamine or a salt of the aliphatic triamine, and an aliphatic ether diamine or a salt of the aliphatic ether diamine.

The present invention also relates to a method for producing a water-resistant organic thin film, comprising the step of bringing a waterproofing treatment liquid into contact with one or both surfaces of an organic thin film comprising an organic dye having an anionic group, wherein
the waterproofing treatment liquid contains organic nitrogen compounds, wherein
the organic nitrogen compounds are first, second, and third acyclic organic nitrogen compounds each having two or more nitrogen atoms per molecule, wherein
the nitrogen atoms of each of the first, second, and third organic nitrogen compounds are each in a cationic group, and
the relation $A \leq 0.4$ nm$<B<C$ is satisfied, wherein A represents a distance (nm) between adjacent nitrogen atoms in the first organic nitrogen compound, B represents a distance (nm) between adjacent nitrogen atoms in the second organic nitrogen compound, and C represents a distance (nm) between adjacent nitrogen atoms in the third organic nitrogen compound.

In the method of the invention, the waterproofing treatment liquid preferably contains 3 to 50% by mass of the first organic nitrogen compound, 20 to 80% by mass of the second organic nitrogen compound, and 5 to 60% by mass of the third organic nitrogen compound based on the total mass of the first, second, and third organic nitrogen compounds.

The present invention also relates to an image display device comprising the water-resistant organic thin film of the invention.

Effect of the Invention

The water-resistant organic thin film of the invention is free from cracking, is free from degradation of optical properties in a humidity test, and does not undergo water-induced erosion at its end part. Therefore, the water-resistant organic thin film of the invention may be incorporated, for example, into an image display device, so that the resulting image display device can keep its display performance unchanged for a long period.

BRIEF DESCRIPTION OF THE DRAWING

FIG. 1 is a picture showing a method for measuring the length of water-induced erosion at an end part of an organic thin film.

MODE FOR CARRYING OUT THE INVENTION

1. Water-Resistant Organic Thin Film

The water-resistant organic thin film of the invention is a water-resistant organic thin film obtained by crosslinking, with specific first, second, and third organic nitrogen compounds, an organic thin film comprising an organic dye having an anionic group. Hereinafter, the features of the water-resistant organic thin film will be described in detail.

(1) Organic Dye Having an Anionic Group

The organic dye having an anionic group is an organic compound capable of forming an organic thin film such as a polarizing film having absorption dichroism.

Examples of the anionic group include a sulfonic acid group, a carboxyl group, a phosphate group, and a group of a salt thereof. In particular, a sulfonic acid or a sulfonic acid salt group (—$SO_3M$ group, wherein M represents a counter ion) is preferred, and a sulfonic acid salt group is more preferred.

The organic dye may have any number of anionic groups. The organic dye preferably has two or more anionic groups per molecule, more preferably two to five anionic groups per molecule, even more preferably two to four anionic groups per molecule. The organic dye having two or more anionic groups per molecule has a high affinity for an aqueous solvent and therefore is soluble in an aqueous solvent, so that a good coating liquid can be easily prepared with it. It is also conceivable that in the crosslinking treatment (waterproofing treatment), the two or more anionic groups can function to form two or more crosslink points with an organic nitrogen compound having two or more nitrogen atoms. Therefore, the organic dye having two or more anionic groups can form supramolecules whose alignment is less likely to be disturbed.

Examples of the organic dye include compounds disclosed in for example, JP-A-2007-126628 and JP-A-2006-323377.

When the organic dye has two or more anionic groups, the anionic groups are preferably not adjacent to each other (or not in ortho position to each other), more preferably in meta position to each other. In the organic dye having anionic groups in meta position to each other, there is less steric hindrance between the anionic groups, so that the organic dye molecules can be linearly aligned before or after the crosslinking treatment (waterproofing treatment) and thus form a water-resistant organic film with a high degree of polarization.

The organic dye is preferably, for example, an azo compound represented by the general formula (I) or (II) below.

[Formula 1]

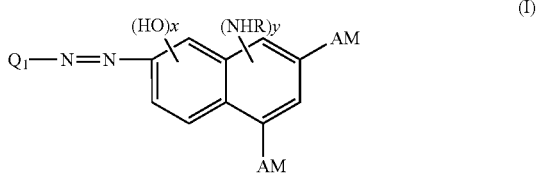

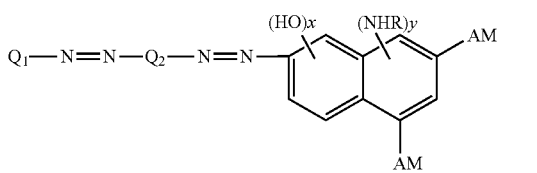

In the general formulae (I) and (II), $Q_1$ represents a substituted or unsubstituted aryl group, $Q_2$ represents a substituted or unsubstituted arylene group, A represents an anionic group, M represents a counter ion to the anionic group, R represents a hydrogen atom, a substituted or unsubstituted alkyl group of 1 to 3 carbon atoms, a substituted or unsubstituted acetyl group, a substituted or unsubstituted benzoyl group, or a substituted or unsubstituted phenyl group, x represents an integer of 0 to 4, and y represents an integer of 0 to 4, provided that x+y≤5.

The aryl group may be a phenyl group or a fused ring group including fused benzene rings, such as a naphthyl group. The arylene group may be a phenylene group or a fused ring group including fused benzene rings, such as a naphthylene group.

The $Q_1$ group is preferably a substituted or unsubstituted phenyl group, more preferably a para-substituted phenyl group. The $Q_2$ group is preferably a substituted or unsubstituted naphthylene group, more preferably a substituted or unsubstituted 1,4-naphthylene group.

The A group may be, for example, a sulfonic acid group, a carboxyl group, a phosphate group, or a group of a salt thereof, preferably a sulfonic acid group or a sulfonic acid salt group, more preferably a sulfonic acid salt group. The M is a hydrogen atom, an alkali metal atom, an alkaline-earth metal atom, or a metal ion. After the organic thin film including the azo compound represented by the general formula (I) or (II) is subjected to the crosslinking treatment (waterproofing treatment), some or all of the M moieties in the molecules of the general formula (I) or (II) form cationic species, which are derived from the organic nitrogen compound.

The R is preferably a hydrogen atom or a substituted or unsubstituted alkyl group of 1 to 3 carbon atoms, more preferably a hydrogen atom. The letter x is preferably an integer of 0 to 2, more preferably an integer of 0 to 1. The letter y is preferably an integer of 0 to 2, more preferably an integer of 0 to 1.

The aryl group, the arylene group, the alkyl group of 1 to 3 carbon atoms, the benzoyl group, or the phenyl group may have a substituent, examples of which include a halogen atom, a nitro group, a cyano group, a dihydroxypropyl group, a phenylamino group, —OM, —COOM, —SO$_3$M, an alkyl group of 1 to 6 carbon atoms, an alkoxy group of 1 to 6 carbon atoms, an alkylamino group of 1 to 6 carbon atoms, and an acylamino group of 1 to 6 carbon atoms. Among them, an anionic group such as a nitro group or an —SO$_3$M group is preferred. M has the same meaning as defined above.

The organic dye is more preferably an azo compound represented by the general formula (III) below.

[Formula 2]

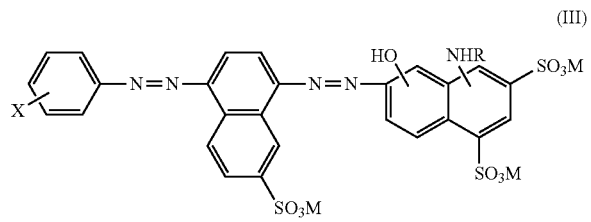

(III)

In the general formula (III), X represents a hydrogen atom, a halogen atom, a nitro group, a cyano group, a substituted or unsubstituted alkyl group of 1 to 4 carbon atoms, a substituted or unsubstituted alkoxy group of 1 to 4 carbon atoms, or an —SO$_3$M group, preferably represents a hydrogen atom, a nitro group, or a cyano group, and more preferably represents a nitro group. In the general formula (III), R and M have the same meanings as R and M in the general formula (I). The alkyl group of 1 to 4 carbon atoms or the alkoxy group of 1 to 4 carbon atoms, represented by X in the general formula (III), may also have a substituent, examples of which include those listed above.

When dissolved in a solvent, the organic dye such as the azo compound can form supramolecular assemblies, in which the dye molecules in the solvent are stacked in a columnar fashion, and can exhibit liquid-crystalline properties (lyotropic liquid-crystalline properties). The supramolecular assemblies formed in the solvent can maintain their state also in a dry coating film. When a coating liquid containing the organic dye is cast in a specific direction, shear stress is applied to the supramolecular assemblies, so that a coating film of the supramolecular assemblies with their long axes aligned in the casting direction can be formed exhibiting good absorption dichroism. The method for aligning the supramolecular assemblies is not limited to the application of shear stress. For example, the coating liquid may be applied onto an alignment layer-bearing substrate so that the supramolecular assemblies can be aligned. The alignment layer can be formed by a mechanical alignment process such as a rubbing process or a chemical alignment process such as a photo-alignment process.

Alternatively, the organic dye in the coating liquid may be in an isotropic state. In such a case, after the coating liquid is applied to form a coating film, the isotropic phase can be converted to a liquid crystalline phase.

In the azo compound of the general formula (III), the two or more —SO$_3$M groups are not adjacent to each other, so that there is less steric hindrance between the —SO$_3$M groups. Therefore, the azo compound molecules can be linearly aligned before or after the crosslinking treatment (waterproofing treatment) to form a water-resistant organic thin film (polarizing film) with a high degree of polarization.

The content of the organic dye in the water-resistant organic thin film of the invention is preferably, but not limited to, 70% by mass to less than 100% by mass, more preferably 80% by mass to less than 99% by mass, based on the total mass of the water-resistant organic thin film.

(2) Organic Nitrogen Compounds

The organic nitrogen compounds are three organic nitrogen compounds (first, second, and third organic nitrogen compounds) having different distances between nitrogen atoms.

The first, second, and third organic nitrogen compounds each have two or more nitrogen atoms per molecule, preferably two to five nitrogen atoms per molecule, more preferably two or three nitrogen atoms per molecule, even more preferably two nitrogen atoms per molecule. If the organic nitrogen compound has more than five nitrogen atoms, the compound may form too complicated crosslink points with the anionic group of the organic dye. Too complicated crosslink points may disturb the alignment of the organic dye molecules and thus may degrade the optical properties of the organic thin film. On the other hand, when the number of nitrogen atoms in the organic nitrogen compound falls within the range, the formation of too many crosslink points between the compound and the organic dye can be prevented, and the organic dye molecules can be firmly crosslinked without alignment disturbance.

The nitrogen atoms in each of the first, second, and third organic nitrogen compounds are each preferably in a cationic group. In addition, the first, second, and third organic nitrogen compounds each preferably have a cationic group at each of both molecular ends (for example, both ends of the main chain).

Examples of the cationic group include an amino group, a guanidino group, an imino group, an ammonium group, and a salt thereof. The salt may be an inorganic acid salt such as a hydrochloric acid salt, a sulfuric acid salt, or a phosphoric acid salt; or an organic acid salt such as an acetic acid salt, a formic acid salt, or an oxalic acid salt. In particular, an amino group or a salt thereof is preferred.

The amino group may be represented by —NH$_2$, —NHR$^1$, —NHR$^2$, or —NR$^1$R$^2$. R$^1$ and R$^2$ each independently represent a substituted or unsubstituted alkyl group or halogen. The alkyl group preferably has four or less carbon atoms, more preferably two or less carbon atoms. Examples of the amino group include a methylamino group, an ethylamino group, a propylamino group, and a dimethylamino group.

The first, second, and third organic nitrogen compounds are also acyclic compounds. When the organic nitrogen compounds are acyclic, the compounds are less likely to disturb the alignment of the organic dye molecules and more successfully crosslink the organic dye molecules as compared with cyclic compounds. This is because cyclic compounds are relatively bulky and stiff whereas acyclic compounds are relatively flexible. Therefore, the use of the acyclic organic nitrogen compounds makes it possible to obtain a water-resistant organic thin film with higher mechanical strength and to keep the resulting water-resistant organic thin film free from defects such as cracks.

In particular, in view of flexibility, the acyclic organic nitrogen compounds are preferably acyclic aliphatic nitrogen compounds. Examples of the acyclic organic nitrogen compounds (acyclic aliphatic nitrogen compounds) include aliphatic diamines such as alkylenediamines or salts thereof; aliphatic triamines such as alkylenetriamines or salts thereof; aliphatic tetraamines such as alkylenetetramines or salts thereof; aliphatic pentaamines such as alkylenepentamines or salts thereof; and aliphatic ether diamines such as alkylene ether diamines or salts thereof. The acyclic organic nitrogen compounds preferably have 2 to 12 carbon atoms.

In a particularly preferred mode, the first, second, and third organic nitrogen compounds are each independently at least one selected from an aliphatic diamine or a salt thereof, an aliphatic triamine or a salt thereof, and an aliphatic ether diamine or a salt thereof. These aliphatic diamines and the like preferably have at least amino groups or salts thereof at both ends of the main chain. The acyclic organic nitrogen compounds may be linear or branched, preferably linear. When the organic nitrogen compounds used are linear, a water-resistant organic thin film with higher mechanical strength can be obtained.

Examples of linear aliphatic diamines include 1,2-ethylenediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, and 1,12-dodecanediamine. In particular, a linear alkylenediamine of 2 to 8 carbon atoms is preferably used, such as 1,2-ethylenediamine, 1,3-propanediamine, 1,4-butanediamine, 1,5-pentanediamine, 1,6-hexanediamine, or 1,7-heptanediamine.

Examples of branched aliphatic diamines include 1-butyl-1,2-ethanediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, and 3-methyl-1,5-pentanediamine.

Examples of aliphatic triamines include bis(hexamethylene)triamine, diethylenetriamine, dipropylenetriamine, 1,2,4-butanetriamine, 1,2,5-pentanetriamine, 1,3,5-pentanetriamine, 1,2,6-hexanetriamine, and 1,4,7-heptanetriamine. Examples of aliphatic tetraamines include triethylenetetramine and tetraethylenetetramine. Examples of aliphatic pentaamines include tetraethylenepentamine and the like. Examples of linear aliphatic ether diamines of 2 to 8 carbon atoms include 2,2'-oxybis(ethylamine), 3,3'-oxybis(propylamine), and 1,2-bis(2-aminoethoxy)ethane.

The first, second, and third organic nitrogen compounds used in the invention have different distances between nitrogen atoms. Specifically, the relation A≤0.4 nm<B<C is satisfied, wherein A represents the distance (nm) between adjacent nitrogen atoms in the first organic nitrogen compound, B represents the distance (nm) between adjacent nitrogen atoms in the second organic nitrogen compound, and C represents the distance (nm) between adjacent nitrogen atoms in the third organic nitrogen compound.

The distance A (nm) between nitrogen atoms in the first organic nitrogen compound is preferably from 0.30 to 0.40 nm. The distance B (nm) between nitrogen atoms in the second organic nitrogen compound is more than 0.40 nm and preferably 0.70 nm or less, more preferably from 0.40 to 0.60 nm. The distance C (nm) between nitrogen atoms in the third organic nitrogen compound is preferably more than 0.70 nm and not more than 1.80 nm, more preferably from 0.80 to 1.00 nm.

The first organic nitrogen compound, which has a relatively short distance between adjacent nitrogen atoms, can crosslink the organic dye molecules relatively close to each other. This makes the alignment of the organic dye molecules less likely to be disturbed and increases the water resistance, but decreases the flexibility of the coating film and makes the coating film more likely to be cracked. The second organic nitrogen compound, in which the distance between adjacent nitrogen atoms is between those in the first and third organic nitrogen compounds, can have a similar effect on the organic thin film as the first organic nitrogen compound, but the degree of the effect is lower than that of the first organic nitrogen compound.

The third organic nitrogen compound, which has a relatively long distance between adjacent nitrogen atoms, can crosslink the organic dye molecules relatively distant from each other. This makes the coating film flexible and suppresses cracking, but makes the alignment of the organic dye molecules more likely to be disturbed and decreases the water resistance.

Therefore, the use of the first, second, and third organic nitrogen compounds with different distances between nitrogen atoms for crosslinking makes it possible to cancel out the adverse effects of the first, second, and third organic nitrogen compounds on the organic thin film, such as cracking and a decrease in water resistance. Thus, the water-resistant organic thin film of the invention is free from appearance defects such as cracks and has a sufficient level of water resistance. Therefore, the water-resistant organic thin film of the invention hardly changes its optical properties at high temperature and high humidity and does not undergo water-induced erosion at its end part, so that its end part can be prevented from being almost optically isotropic. If the end part of the organic thin film is eroded by water, the alignment of the molecules will be destroyed at the end part of the film, so that the end part of the film can be almost optically isotropic. Therefore, transmission observation of the end part of the organic thin film with a polarizing microscope can determine whether or not the part is eroded by water (see FIG. 1).

As used herein, the term "the distance between adjacent nitrogen atoms" means the distance in a straight line from one of two adjacent nitrogen atoms to the other in a three-dimensional molecule. If the organic nitrogen compound has three or more nitrogen atoms, there are two or more distances between adjacent nitrogen atoms. In this case, the term "the distance between adjacent nitrogen atoms" refers to the smallest value among the two or more distances between nitrogen atoms.

As shown in formula (A) below, for example, d1 is the distance between nitrogen atoms in 1,3-propanediamine. The distance d1 is the distance in a straight line between nitrogen atoms in the molecule being sterically stabilized. As shown in formula (B) below, there are two distances between adjacent nitrogen atoms in 2,5-pentanetriamine. The distance between a first pair of adjacent nitrogen atoms is represented by d2, and that between a second pair of adjacent nitrogen atoms is represented by d3. The distances d2 and d3 are each the distance in a straight line between nitrogen atoms in the molecule being sterically stabilized. In the invention, the distance d2 corresponds to the distance between adjacent nitrogen atoms in 1,2,5-pentanetriamine.

[Formula 3]

(A)

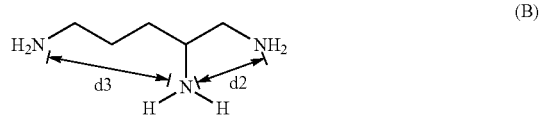

(B)

Table 1 below shows a list of some examples of the distance between adjacent nitrogen atoms in some organic nitrogen compounds.

TABLE 1

| Acyclic organic nitrogen compound | Distance (nm) between nitrogen atoms | Number of atoms between nitrogen atoms |
|---|---|---|
| 1,2-ethylenediamine | 0.38 | 2 |
| 1,3-propanediamine | 0.50 | 3 |
| 1,4-butanediamine | 0.63 | 4 |
| 1,5-pentanediamine | 0.75 | 5 |
| 1,6-hexanediamine | 0.88 | 6 |
| 1,7-heptanediamine | 1.00 | 7 |
| 1,8-octanediamine | 1.13 | 8 |
| 1,9-nonanediamine | 1.26 | 9 |
| 1,10-decanediamine | 1.39 | 10 |
| 1,11-undecanediamine | 1.51 | 11 |
| 1,12-dodecanediamine | 1.64 | 12 |
| 2,2'-oxybis(ethylamine) | 0.73 | 5 |
| bis(hexamethylene)triamine | 0.88 | 6 |

The distance between nitrogen atoms shown in Table 1 can be calculated by the following method.

The structure of each organic nitrogen compound is calculated by MM2 calculation with "Minimize Energy" option using Chem 3D Pro (produced by Cambridge Soft Corporation). Based on the resulting structure, MOPAC calculation (Minimize Energy) is performed to calculate the stabilized state of the compound, and then the distance between nitrogen atoms is calculated.

The difference (B−A) between the distance A (nm) between adjacent nitrogen atoms in the first organic nitrogen compound and the distance B (nm) between adjacent nitrogen atoms in the second organic nitrogen compound is preferably from 0.05 to 0.40 nm, more preferably from 0.05 to 0.30 nm, even more preferably from 0.05 to 0.20 nm. The difference (C−A) between the distance A (nm) between adjacent nitrogen atoms in the first organic nitrogen compound and the distance C (nm) between adjacent nitrogen atoms in the third organic nitrogen compound is preferably from 0.10 to 0.90 nm, more preferably from 0.10 to 0.70 nm, even more preferably from 0.20 to 0.60 nm.

The ratio (A/B) of the distance A (nm) between adjacent nitrogen atoms in the first organic nitrogen compound to the distance B (nm) between adjacent nitrogen atoms in the second organic nitrogen compound is preferably, but not limited to, 0.10 to 0.99, more preferably 0.50 to 0.80. The ratio (A/C) of the distance A (nm) between adjacent nitrogen atoms in the first organic nitrogen compound to the distance C (nm) between adjacent nitrogen atoms in the third organic nitrogen compound is preferably, but not limited to, 0.10 to 0.99, more preferably 0.10 to 0.50.

Among specific compounds for the first, second, and third organic nitrogen compounds, the first organic nitrogen compound may be 1,2-ethylenediamine or 1,2-propanediamine. In the invention, the first organic nitrogen compound is preferably 1,2-ethylenediamine. Preferred examples of the second and third organic nitrogen compounds include 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 2,2'-oxybis(ethylamine), and bis(hexamethylene)triamine. The second and third organic nitrogen compounds may be selected from these compounds so as to satisfy the relation B<C. For each of the first, second, and third organic nitrogen compounds, one or more may be selected from the compounds shown above.

As shown in the structure of the preferred organic nitrogen compounds, the first, second, and third organic nitrogen compounds used in the invention preferably have nitrogen atoms at both molecular ends. If the organic nitrogen compound has no nitrogen atom at the molecular end, the molecular end cannot be crosslinked, so that an uncrosslinked free hydrocarbon chain can exist. Such a free hydrocarbon chain is not preferred because it tends to disturb the alignment.

In the water-resistant organic thin film of the invention, the total content of the components derived from the first, second, and third organic nitrogen compounds is preferably more than 0% by mass to 30% by mass, more preferably from 1% by mass to 20% by mass, based on the total mass of the water-resistant organic thin film.

A method for measuring the content of the components derived from the first, second, and third organic nitrogen compounds in the water-resistant organic thin film of the invention may include dissolving the water-resistant organic thin film in a solvent (e.g., dimethylsulfoxide (DMSO)) and subjecting the solution to capillary electrophoresis analysis.

In the invention, an additional organic nitrogen compound other than the first, second, and third organic nitrogen compounds may also be used. Such an additional organic nitrogen compound may have two or more nitrogen atoms or a single nitrogen atom.

(3) Other Components

As long as the effects of the invention are not impaired, the water-resistant organic thin film of the invention may further contain an additional component in addition to the organic dye and the components derived from the organic nitrogen compounds used to crosslink the organic dye molecules. Examples of such an additional component include other organic dyes (organic dyes other than the organic dye having an anionic group), various additives, optional liquid-crystalline compounds, polymers, and the like.

2. Method for Producing Water-Resistant Organic Thin Film

The producing method of the invention includes the step of bringing an organic nitrogen compound-containing waterproofing treatment liquid into contact with one or both surfaces of an organic thin film including an organic dye having an anionic group.

(1) Organic Thin Film-Producing Step

An organic thin film including an organic dye having an anionic group is used in the producing method of the invention. This organic thin film can be obtained by a process that includes applying, to a substrate, a coating liquid containing the organic dye to form a coating film and drying the coating film. The organic dye to be used may be any of the exemplary dyes shown above and is preferably the azo compound of the general formula (III). The organic dye may be dissolved in a suitable solvent to prepare a coating liquid.

The solvent may be any conventionally known solvent and is preferably a solvent capable of dissolving the organic dye well. The solvent capable of dissolving the organic dye well may be, for example, an aqueous solvent, more specifically water, a hydrophilic solvent, or a mixed solvent of water and a hydrophilic solvent. In particular, water or a mixed solvent of water and a hydrophilic solvent is more preferred. The hydrophilic solvent is a solvent uniformly soluble in water. Examples of the hydrophilic solvent include alcohols such as methanol, ethanol, methyl alcohol, and isopropyl alcohol; glycols such as ethylene glycol and diethylene glycol; cellosolves such as methyl cellosolve and ethyl cellosolve; ketones such as acetone and methyl ethyl ketone; and esters such as ethyl acetate.

The concentration of the organic dye in the coating liquid is preferably, but not limited to, a concentration at which the organic dye can form a liquid crystalline phase. For example, such a concentration is preferably from 0.5 to 50% by mass. The coating liquid may also be in an isotropic phase.

The coating liquid may also contain an additive. Examples of such an additive include a plasticizer, a heat stabilizer, a light stabilizer, a lubricant, an antioxidant, an ultraviolet absorber, a flame retardant, a colorant, an antistatic agent, an antimicrobial agent, a compatibility accelerator, a crosslinking agent, a thickener, and a surfactant. The concentration of the additive in the coating liquid is preferably 0 to 10% by mass.

The substrate, to which the coating liquid is applied, may be typically, but not limited to, a synthetic resin film, a glass plate, or the like. The substrate is preferably a polymer film, more preferably a polymer film with good transparency (for example, with a haze value of 5% or less). A laminate including the polymer film may also be used as the substrate. The substrate to be used more preferably has an alignment layer.

The alignment layer can be formed on the substrate by subjecting the substrate to an alignment process. The alignment process may be a mechanical alignment process such as a rubbing process or a chemical alignment process such as a photo-alignment process.

When the surface of the substrate, to which the coating liquid is to be applied, has low hydrophilicity, the surface is preferably subjected to a hydrophilization treatment. The hydrophilization treatment may be a dry treatment or a wet treatment. Examples of the dry treatment include a corona treatment, a discharge treatment such as a plasma treatment or a glow discharge treatment, a flame treatment, an ozone treatment, a UV-ozone treatment, and an ionizing active radiation treatment such as an ultraviolet ray treatment or an electron beam treatment. Examples of the wet treatment include an ultrasonic treatment using a solvent such as water or acetone, an alkali treatment, and an anchor coat treatment. These treatments may be performed singly or in combination of two or more.

The thickness of the substrate is not restricted and may be appropriately designed depending on strength or other properties. In view of a reduction in thickness and weight, the thickness of the substrate is preferably 300 µm or less, more preferably from 5 to 200 µm, even more preferably from 10 to 100 µm.

The coating liquid may be applied by a coating method using a suitable coater. Examples of such a coater include a bar coater, a reverse roll coater, a forward roll coater, a gravure coater, a rod coater, a slot die coater, a slot orifice coater, a curtain coater, and a fountain coater.

When the coating liquid being applied has a liquid crystalline phase, shear stress is applied to the organic dye in the process of allowing the coating liquid to flow. This makes it possible to form a coating film including the organic dye molecules aligned in a specific direction. In this case, the organic dye molecules are aligned by shear stress applied during the casting of the coating liquid. Alternatively, the organic dye molecules may be aligned by other means instead of or in combination with the application of shear stress.

Examples of such other means include a method of applying the coating liquid to a substrate having undergone an alignment process and a method including applying the coating liquid to a substrate to form a coating film and then applying a magnetic or electric field to the coating film. Any one of these methods may be performed alone to form a coating film including the organic dye molecules aligned in a specific direction.

The method for applying the coating liquid is not limited to the method of applying the coating liquid with a liquid crystalline phase. Alternatively, the coating liquid with an isotropic phase may be applied to form a coating film, and then the isotropic phase may be converted to a liquid crystalline phase.

The coating film may be dried by any method, such as air drying or a drying method using an air circulation-type thermostatic oven, a heater, a heat pipe roll, a heated metal belt, or other drying means. The drying temperature may be equal to or lower than the isotropic phase transition temperature of the coating liquid. It is preferable to raise the drying temperature gradually from a low temperature to a high temperature. Specifically, the drying temperature is preferably from 10 to 80° C., more preferably from 20 to 60° C. Within these temperature ranges, a dry coating film with less unevenness in thickness can be obtained. The drying time may be appropriately selected. In the case of air drying, the drying time is preferably from 1 second to 120 minutes, more preferably from 10 seconds to 5 minutes.

In the drying process, the coating film increases in density, and the aligned organic dye molecules are fixed. As the alignment of the organic dye molecules is fixed, absorption dichroism is induced. The resulting organic thin film (dry coating film) preferably has a thickness of 0.1 to 10 µm.

(2) Step of Bringing into Contact with Waterproofing Treatment Liquid

In the producing method of the invention, a waterproofing treatment liquid containing the first, second, and third organic nitrogen compounds is brought into contact with one or both surfaces of the organic thin film obtained as described above. When the organic thin film is formed on a substrate, the waterproofing treatment liquid is brought into contact with the surface of the coating film opposite to its surface in contact with the substrate. If necessary, the waterproofing treatment liquid may also contain an additional organic nitrogen compound and/or an additional component other than the first, second, and third organic nitrogen compounds. Specific examples of the first, second, and third organic nitrogen compounds and the additional organic nitrogen compound and component may be the same as those listed above.

The waterproofing treatment liquid can be prepared by dissolving or dispersing the first, second, and third organic nitrogen compounds and other materials in a suitable solvent. The solvent is preferably an aqueous solvent. Examples of the solvent may be the same as those listed above.

The solid concentration of the waterproofing treatment liquid, specifically, the concentration of the first, second, and third organic nitrogen compounds in the waterproofing treatment liquid, is preferably from 3 to 30% by mass, more preferably from 5 to 20% by mass. Based on the total mass of the first, second, and third organic nitrogen compounds, the waterproofing treatment liquid preferably contains 3 to 50% by mass of the first organic nitrogen compound, 20 to 80% by mass of the second organic nitrogen compound, and 5 to 60% by mass of the third organic nitrogen compound, more preferably 5 to 40% by mass of the first organic nitrogen compound, 30 to 70% by mass of the second organic nitrogen compound, and 10 to 50% by mass of the third organic nitrogen compound. When the concentration of the first, second, and third organic nitrogen compounds in the waterproofing treatment liquid falls within the ranges, the resulting water-resistant organic thin film is free from cracking, is free from degradation of optical properties in a humidity test, and does not undergo water-induced erosion at its end part.

The waterproofing treatment liquid may be brought into contact with the organic thin film by any method, such as a method of applying the waterproofing treatment liquid to the surface of the organic thin film or a method of dipping the organic thin film in the waterproofing treatment liquid. The waterproofing treatment liquid can be applied using any of the coaters listed above, a spray, or other means. Before these methods are used, the surface of the organic thin film is preferably washed with water or any other solvent and then dried.

Among these contact methods, the method of dipping the organic thin film in the waterproofing treatment liquid is preferred. This method makes it possible to reliably bring the waterproofing treatment liquid into contact with the whole of the organic thin film and to facilitate the infiltration of the waterproofing treatment liquid into the organic thin film, so that larger amounts of the organic dye and the organic nitrogen compounds can be crosslinked, which is advantageous.

When the waterproofing treatment liquid is brought into contact with the organic thin film, the organic dye molecules in the organic thin film are crosslinked with the first, second, and third organic nitrogen compound molecules interposed therebetween. Because of the crosslinking, the resulting water-resistant organic thin film of the invention has a high level of water resistance and mechanical strength and keeps its optical properties almost unchanged at high temperature and high humidity.

The water-resistant organic thin film of the invention may contain a certain amount of the organic nitrogen compound not involved in the crosslinking. However, an excess amount of the waterproofing treatment liquid deposited on the water-resistant organic thin film is preferably removed by cleaning and/or drying the surface of the organic thin film after the waterproofing treatment. Specifically, for example, after the waterproofing treatment, the organic thin film may be washed with water and then dried. Alternatively, after the waterproofing treatment, the organic thin film may be simply dried.

The water-resistant organic thin film of the invention may be used as a polarizing film. For example, the water-resistant organic thin film of the invention may be used to form a polarizing plate, which includes the water-resistant organic thin film and a protective film or films placed on one or both sides of the thin film. When used to form a polarizing plate, the water-resistant polarizing film may be laminated with a retardation film.

The water-resistant organic thin film obtained by the producing method of the invention may be used while placed on the substrate or may be peeled off from the substrate before use. The substrate can be used as a protective film when the water-resistant organic thin film is used while placed on the substrate.

The invention is also directed to an image display device including the water-resistant organic thin film. Examples of the image display device include liquid crystal display devices, organic EL displays, and plasma displays, etc.

EXAMPLES

Hereinafter, the invention will be more specifically described with reference to Examples and Comparative Examples. It will be understood that the examples shown below are not intended to limit the invention.

Synthesis Example 1

A monoazo compound was obtained by subjecting 4-nitroaniline and 8-amino-2-naphthalenesulfonic acid to diazotization and coupling reaction according to a conventional method (the method described in Riron Seizo Senryo Kagaku (Dye Chemistry, Theory and Production), 5th Edition, pp. 135-152, published by GIHODO SHUPPAN Co., Ltd., Jul. 15, 1968). The resulting monoazo compound was subjected to diazotization by the conventional method. The product was then subjected to coupling reaction with 1-amino-8-naphthol-2,4-disulfonic acid lithium salt to form a crude product. The product was salted out with lithium chloride to give an azo compound of the following structural formula.

[Formula 4]

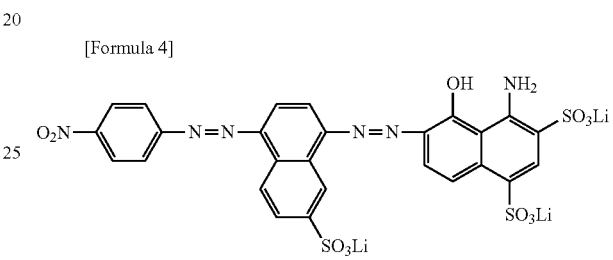

Example 1

The azo compound obtained in Synthesis Example 1 was dissolved in ion-exchanged water to prepare an 8% by mass coating liquid. Using a bar coater (Mayer rot HS4 (product name) manufactured by BUSHMAN Corporation), the coating liquid was applied to a norbornene polymer film (ZEONOR (trade name) manufactured by ZEON CORPORATION) having undergone a rubbing process and a corona treatment. The coating liquid was then air-dried enough in a thermostatic chamber at 23° C. to form an organic thin film. The resulting organic thin film had a thickness of 0.4 μm. The thickness of the organic thin film was determined as follows. The organic thin film on the polymer film was partially removed by cutting. At the part where the organic thin film was partially removed by cutting, the difference in level between the polymer film and the organic thin film was measured using a three-dimensional noncontact surface profile measuring system (Micromap MM5200 (product name) manufactured by Ryoka Systems Inc.).

A 10% by mass waterproofing treatment liquid was prepared by mixing 1,2-ethylenediamine hydrochloride (manufactured by Tokyo Chemical Industry Co., Ltd., distance A (nm) between nitrogen atoms: 0.38 nm) as a first organic nitrogen compound, 1,3-propanediamine hydrochloride (manufactured by Tokyo Chemical Industry Co., Ltd., distance B (nm) between nitrogen atoms: 0.5 nm) as a second organic nitrogen compound, and bis(hexamethylene)triamine (manufactured by Tokyo Chemical Industry Co., Ltd., distance C (nm) between nitrogen atoms: 0.88 nm) as a third organic nitrogen compound in a mass ratio of 5:70:25 with ion-exchanged water.

The laminate of the substrate and the organic thin film was then immersed in the waterproofing treatment liquid for about 3 seconds. Subsequently, the laminate was taken out of the treatment liquid, and its surface was washed with pure water so that an excess amount of the waterproofing treatment liquid was removed. The treated organic thin film was then dried to give a water-resistant organic thin film with no appearance defects such as cracks.

Example 2

A water-resistant organic thin film was obtained as in Example 1, except that the mass ratio between the first, second, and third organic nitrogen compounds was changed to 15:55:30.

Example 3

A water-resistant organic thin film was obtained as in Example 1, except that the mass ratio between the first, second, and third organic nitrogen compounds was changed to 20:30:50.

Example 4

A water-resistant organic thin film was obtained as in Example 1, except that the mass ratio between the first, second, and third organic nitrogen compounds was changed to 30:60:10.

Example 5

A water-resistant organic thin film was obtained as in Example 1, except that the mass ratio between the first, second, and third organic nitrogen compounds was changed to 40:40:20.

Example 6

A water-resistant organic thin film was obtained as in Example 2, except that 1,4-butanediamine (manufactured by Tokyo Chemical Industry Co., Ltd., distance B (nm) between nitrogen atoms: 0.63 nm) was used as the second organic nitrogen compound instead of 1,3-propanediamine hydrochloride (manufactured by Tokyo Chemical Industry Co., Ltd., distance B (nm) between nitrogen atoms: 0.5 nm).

Example 7

A water-resistant organic thin film was obtained as in Example 2, except that 1,6-hexanediamine (manufactured by Tokyo Chemical Industry Co., Ltd., distance B (nm) between nitrogen atoms: 0.88 nm) was used as the third organic nitrogen compound instead of bis(hexamethylene) triamine (manufactured by Tokyo Chemical Industry Co., Ltd., distance C (nm) between nitrogen atoms: 0.88 nm).

Example 8

A water-resistant organic thin film was obtained as in Example 2, except that 1,4-butanediamine (manufactured by Tokyo Chemical Industry Co., Ltd., distance B (nm) between nitrogen atoms: 0.63 nm) was used as the second organic nitrogen compound instead of 1,3-propanediamine hydrochloride (manufactured by Tokyo Chemical Industry Co., Ltd., distance B (nm) between nitrogen atoms: 0.5 nm) and that 1,6-hexanediamine (manufactured by Tokyo Chemical Industry Co., Ltd., distance B (nm) between nitrogen atoms: 0.88 nm) was used as the third organic nitrogen compound instead of bis(hexamethylene)triamine (manufactured by Tokyo Chemical Industry Co., Ltd., distance C (nm) between nitrogen atoms: 0.88 nm).

Comparative Example 1

A 10% by mass waterproofing treatment liquid was prepared by mixing 1,3-propanediamine hydrochloride (manufactured by Tokyo Chemical Industry Co., Ltd., distance B (nm) between nitrogen atoms: 0.5 nm) (corresponding to the second organic nitrogen compound) and bis(hexamethylene) triamine (manufactured by Tokyo Chemical Industry Co., Ltd., distance C (nm) between nitrogen atoms: 0.88 nm) (corresponding to the third organic nitrogen compound) in a mass ratio of 80:20 with ion-exchanged water. A water-resistant organic thin film was obtained as in Example 1, except that the resulting waterproofing treatment liquid was used instead.

Comparative Example 2

A 10% by mass waterproofing treatment liquid was prepared by mixing 1,2-ethylenediamine hydrochloride (manufactured by Tokyo Chemical Industry Co., Ltd., distance A (nm) between nitrogen atoms: 0.38 nm) (corresponding to the first organic nitrogen compound) and bis(hexamethylene)triamine (manufactured by Tokyo Chemical Industry Co., Ltd., distance C (nm) between nitrogen atoms: 0.88 nm) (corresponding to the third organic nitrogen compound) in a mass ratio of 50:50 with ion-exchanged water. A water-resistant organic thin film was obtained as in Example 1, except that the resulting waterproofing treatment liquid was used instead.

Comparative Example 3

A 10% by mass waterproofing treatment liquid was prepared by mixing 1,2-ethylenediamine hydrochloride (manufactured by Tokyo Chemical Industry Co., Ltd., distance A (nm) between nitrogen atoms: 0.38 nm) (corresponding to the first organic nitrogen compound) and 1,3-propanediamine hydrochloride (manufactured by Tokyo Chemical Industry Co., Ltd., distance B (nm) between nitrogen atoms: 0.5 nm) (corresponding to the second organic nitrogen compound) in a mass ratio of 40:60 with ion-exchanged water. A water-resistant organic thin film was obtained as in Example 1, except that the resulting waterproofing treatment liquid was used instead.

The water-resistant organic thin films obtained in the examples and the comparative examples were evaluated as described below. Each measurement method is as follows.

<Method for Evaluating Cracks>

The organic thin film obtained in each of the examples and the comparative examples was observed with a polarizing microscope (OPTIPHOT-POL (product name) manufactured by Olympus Corporation), and the area of the part where cracks were found to cause light leaks was measured in the field (a region of 5,200 μm×4,000 μm). The ratio of the area of the light leak part to the whole area of the field was calculated. This evaluation procedure was performed five times at five different locations in the organic thin film, and the areas of the light leak parts were averaged. The average was evaluated according to the criteria below. Table 2 shows the evaluation results.

◯: The area of the light leak part is 0% to less than 0.01% (no cracks).

Δ: The area of the light leak part is from 0.01% to less than 5% (small cracks).

X: The area of the light leak part is from 5% to 100% (large cracks).

<Method for Measuring the Transmittance and the Degree of Polarization of Organic Thin Film>

Using a spectrophotometer (U-4100 (product name) manufactured by JASCO Corporation) equipped with a Glan-Thompson polarizer, linearly polarized light with wavelengths of 380 to 780 nm was applied to the organic thin film. Multiplication by a color correction factor for each wavelength and integration were performed to determine the average $k_1$ (the transmittance for linearly polarized light in the maximum transmittance direction) and the average $k_2$ (the transmittance for linearly polarized light in the direction orthogonal to the maximum transmittance direction) in the wavelength region. The transmittance and the degree of polarization of the organic thin film were calculated by substituting the $k_1$ and $k_2$ values into formulae 1 and 2 below.

$$\text{Single transmittance} = (k_1 + k_2)/2 \quad \text{Formula 1}$$

$$\text{Degree of polarization} = \{(k_1 - k_2)/(k_1 + k_2)\} \times 100 \quad \text{Formula 2}$$

<Humidity Test Method, Method for Determining the Amount of Change in Optical Properties, and Method for Determining the Length of Water-Induced Erosion>

The laminate of the organic thin film and the substrate was cut into a piece of 5 cm in length and 2 cm in width. The surface of the organic thin film of the laminate piece was bonded to a glass plate with a transparent pressure-sensitive adhesive (NO. 7 (product name) manufactured by Nitto Denko Corporation) interposed therebetween. The resulting laminate was stored for 500 hours in a thermostat (PH-3KT (product name) manufactured by ESPEC CORP.) at a temperature of 60° C. and a humidity of 90% RH. After the humidity test, the transmittance and the degree of polarization of the organic thin film were determined using the measurement method described above. The central part of the cell (the part not affected by erosion) was subjected to the measurement. ΔThum (the amount of change in transmittance before and after the humidification) and ΔPhum (the amount of change in degree of polarization before and after the humidification) were calculated by substituting the transmittances and the degrees of polarization before and after the humidification into formulae 1 and 2 below.

$$\Delta Thum = T_2 - T_1 \quad \text{Formula 1}$$

$$\Delta Phum = P_2 - P_1 \quad \text{Formula 2}$$

In the formulae, $T_1$ represents the transmittance of the organic thin film before the humidity test, $T_2$, the transmittance of the organic thin film after the humidity test, $P_1$, the degree of polarization of the organic thin film before the humidity test, and $P_2$, the degree of polarization of the organic thin film after the humidity test.

After the humidity test, transmission observation was performed on the end part of the organic thin film using a polarizing microscope (OPTIPHOT-POL (product name) manufactured by Olympus Corporation). In the observation, the length from the end of the organic thin film to the light-transmitting part most distant from the end was determined as the length of water-induced erosion (see FIG. 1).

The distance between nitrogen atoms was calculated by the method described above.

TABLE 2

| | Example | | | | | | | | Comparative Example | | |
|---|---|---|---|---|---|---|---|---|---|---|---|
| | 1 | 2 | 3 | 4 | 5 | 6 | 7 | 8 | 1 | 2 | 3 |
| 1,2-ethylenediamine (parts by mass) | 5 | 15 | 20 | 30 | 40 | 15 | 15 | 15 | 0 | 50 | 40 |
| 1,3-propanediamine (parts by mass) | 70 | 55 | 30 | 60 | 40 | | 55 | | 80 | 0 | 60 |
| 1,4-butanediamine (parts by mass) | | | | | | 55 | | 55 | | | |
| 1,6-hexanediamine (parts by mass) | | | | | | | 30 | 30 | | | |
| 1,6-bis(hexamethylene)triamine (parts by mass) | 25 | 30 | 50 | 10 | 20 | 30 | | | 20 | 50 | 0 |
| Cracks | ○ | ○ | ○ | ○ | ○ | ○ | ○ | ○ | ○ | Δ | Δ |
| Humidity test ΔThum (%) | 0.571 | 0.166 | 0.819 | 0.698 | 0.757 | 0.293 | 0.388 | 0.11 | −0.765 | −0.288 | 0.739 |
| ΔPhum (%) | −0.671 | 0.373 | 0.617 | 0.438 | 0.362 | 0.794 | 0.913 | 0.371 | 0.460 | −7.35 | 0.289 |
| Water-induced erosion length (mm) | 0 | 0 | 0.1 | 0 | 0.17 | 0.11 | 0 | 0 | 2.04 | 3 | 2.3 |

[Evaluation]

In Examples 1 to 8, where the waterproofing treatment was performed using a waterproofing treatment liquid containing first, second, and third organic nitrogen compounds with different distances between nitrogen atoms, the amounts of changes in transmittance and degree of polarization were each ±0.9% or less, the length of water-induced erosion was 0.2 mm or less, and the optical properties were found to be hardly changed even under heating and humidification. However, in Comparative Examples 1 to 3, where the waterproofing treatment was performed using a waterproofing treatment liquid containing only two organic nitrogen compounds, the length of water-induced erosion increased to 2 mm or more.

The invention claimed is:

1. A water-resistant organic thin film obtained by cross-linking, with organic nitrogen compounds, an organic thin film comprising an organic dye having an anionic group, wherein
   the organic nitrogen compounds are first, second, and third acyclic organic nitrogen compounds each having two or more nitrogen atoms per molecule, wherein
   the nitrogen atoms of each of the first, second, and third organic nitrogen compounds are each in a cationic group, and
   the relation A≤0.4 nm<B<C is satisfied, wherein A represents a distance (nm) between adjacent nitrogen atoms in the first organic nitrogen compound, B represents a distance (nm) between adjacent nitrogen atoms in the second organic nitrogen compound, and C represents a distance (nm) between adjacent nitrogen atoms in the third organic nitrogen compound, wherein the distance A (nm) between nitrogen atoms in the first organic nitrogen compound is from 0.30 nm to 0.40 nm, the distance B (nm) between nitrogen atoms in the second organic nitrogen compound is more than 0.40 nm to 0.70 nm, and the distance C (nm) between nitrogen atoms in the third organic nitrogen compound is more than 0.70 nm to 1.80 nm, wherein the water-resistant organic thin film contains 5 to 40% by mass of the first organic nitrogen compound, 30 to 70% by mass of the second organic nitrogen compound, and 10 to 50% by mass of the third organic nitrogen compound based on the total mass of the first, second, and third organic nitrogen compounds, and a content of the first organic nitrogen compound is less than a content of the second organic nitrogen compound in the water-resistant organic thin film.

2. The water-resistant organic thin film according to claim 1, wherein the first, second, and third organic nitrogen compounds each have two to five nitrogen atoms per molecule.

3. The water-resistant organic thin film according to claim 1, wherein the cationic group is an amino group or a salt of the amino group.

4. The water-resistant organic thin film according to claim 1, wherein the first, second, and third organic nitrogen compounds are each a compound having an amino group or a salt of the amino group at a molecular end.

5. The water-resistant organic thin film according to claim 1, wherein the first, second, and third organic nitrogen compounds are each independently at least one selected from the group consisting of an aliphatic diamine or a salt of the aliphatic diamine, an aliphatic triamine or a salt of the aliphatic triamine, and an aliphatic ether diamine or a salt of the aliphatic ether diamine.

6. An image display device comprising the water-resistant organic thin film according to claim 1.

7. A method for producing a water-resistant organic thin film, comprising the step of bringing a waterproofing treatment liquid into contact with one or both surfaces of an organic thin film comprising an organic dye having an anionic group, wherein the waterproofing treatment liquid contains organic nitrogen compounds, wherein the organic nitrogen compounds are first, second, and third acyclic organic nitrogen compounds each having two or more nitrogen atoms per molecule, wherein the nitrogen atoms of each of the first, second, and third organic nitrogen compounds are each in a cationic group, and the relation A≤0.4 nm<B<C is satisfied, wherein A represents a distance (nm) between adjacent nitrogen atoms in the first organic nitrogen compound, B represents a distance (nm) between adjacent nitrogen atoms in the second organic nitrogen compound, and C represents a distance (nm) between adjacent nitrogen atoms in the third organic nitrogen compound, wherein the distance A (nm) between nitrogen atoms in the first organic nitrogen compound is from 0.30 nm to 0.40 nm, the distance B (nm) between nitrogen atoms in the second organic nitrogen compound is more than 0.40 nm to 0.70 nm, and the distance C (nm) between nitrogen atoms in the third organic nitrogen compound is more than 0.70 nm to 1.80 nm, wherein the waterproofing treatment liquid contains 5 to 40% by mass of the first organic nitrogen compound, 30 to 70% by mass of the second organic nitrogen compound, and 10 to 50% by mass of the third organic nitrogen compound based on the total mass of the first, second, and third organic nitrogen compounds, and a content of the first organic nitrogen compound is less than a content of the second organic nitrogen compound in the water-resistant organic thin film.

* * * * *